UNITED STATES PATENT OFFICE.

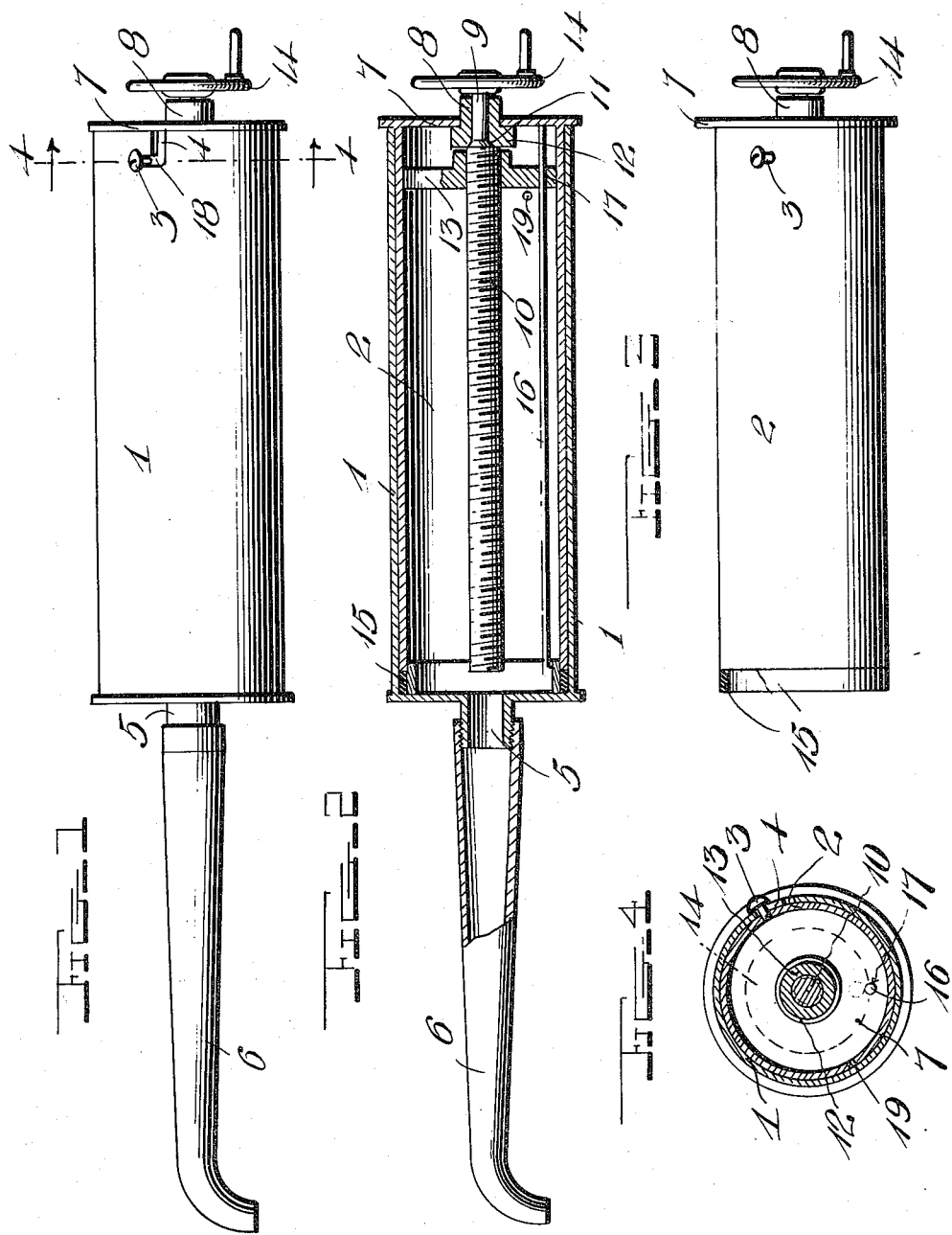

GEORGE W. STONE, JR., OF BURLINGTON, WISCONSIN, ASSIGNOR OF ONE-HALF TO HERBERT J. JULIEN, OF MILWAUKEE, WISCONSIN.

GREASE-GUN.

976,945.　　　　　Specification of Letters Patent.　　Patented Nov. 29, 1910.

Application filed August 9, 1909, Serial No. 511,991.　Renewed June 29, 1910.　Serial No. 569,530.

*To all whom it may concern:*

Be it known that I, GEORGE W. STONE, Jr., a citizen of the United States, residing at Burlington, in the county of Racine and State of Wisconsin, have invented certain new and useful Improvements in Grease-Guns; and I do declare the following to be a full, clear, and exact description of the invention, such as will enable others skilled in the art to which it appertains to make and use the same.

This invention relates to a grease gun designed for the purpose of forcing light or heavy oils or grease into oil cups, gear casings, etc., of automobiles or other devices.

With this and other objects in view, the invention consists of certain novel features of construction, combination and arrangement of parts as will be more fully described and particularly pointed out in the appended claim.

In the drawings, Figure 1 is a side elevation of the device complete; Fig. 2 is a central longitudinal section thereof. Fig. 3, is an elevation of the inner tube, and Fig. 4, is a vertical transverse section taken on line 4—4 of Fig. 1, looking in the direction indicated by the arrows.

Referring to the drawings for a more particular description of the invention, the device comprises an outer cylindrical casing 1 and an inner tube or casing 2 which fits closely within the outer casing and may be locked or secured therein by a screw 3, carried by the inner tube, which is adapted to engage a bayonet slot 4, in the inner or upper end of the outer tube. The outer end of the outer tube is provided with an exteriorly threaded nipple 5, upon which is screwed the nozzle 6. The inner end of the inner tube 2, is closed in by the cover 7 provided with the central outwardly extending cylindrical bearing 8, which receives the inner reduced end 9, of the central operating screw 10. The shoulder 11, formed by reducing the inner end of the screw, seats in a socket or recess formed in the annular flange 12, arranged at the inner end of the bearing.

The piston 13, is screwed upon the operating screw 10, and is caused to advance toward the outer end of the tube to force the oil or grease through the nozzle 6, by turning the operating handle 14, arranged at the outer end of the extension 9, in the proper direction.

A washer or gasket 15, is arranged at the outer end of the inner tube and fits closely against the inner surface of the outer tube, providing an air-tight joint. The piston 13, is held against turning upon the screw 10 when the latter is operated, by the guide wire 16, which extends longitudinally of the inner tube and passes through a corresponding aperture 17, in the piston at a point near the periphery thereof.

In practice, to fill the gun with light or heavy oil, the nozzle 6, is first inserted in the oil and the crank handle 14, then turned to the left to move the piston to the outer end of the inner tube when the oil is drawn into the inner tube. To fill the gun with grease, the inner tube is removed and forced down into the grease can after turning the operating screw to cause the piston 13, to move to the inner end of the tube.

The inner end of the tube is provided with a vent hole 19, for the purpose of allowing the air to escape from the tube as it is filled with grease. The inner tube is then inserted and locked in the outer tube, when the gun is ready for use. If desired, the gun may be used as a force feed oil cup by simply threading out the box or journal cover and screwing the nipple 5, thereto, the nozzle 6 being omitted.

From the foregoing description, taken in connection with the accompanying drawings, the construction and operation of the invention will be readily understood, without requiring a more extended explanation.

Various changes in the form, proportion and the minor details of construction may be resorted to without departing from the principle or sacrificing any of the advantages of this invention as defined in the appended claim.

Having thus described my invention, what I claim is:

An oil gun comprising an outer tube, an inner tube arranged therein, means for locking the inner tube in the outer tube, a longitudinal operating screw passing through the inner tube, a handle for the operating screw, a nozzle carried by the outer tube, a piston screwing on the operating screw, and a longitudinal guide wire passing through the piston to hold it against turning when the operating screw is turned.

In testimony whereof I have hereunto set my hand in presence of two subscribing witnesses.

GEORGE W. STONE, Jr.

Witnesses:
 HERBERT J. JULIEN,
 HENRY G. DISCH.